United States Patent Office 3,591,550
Patented July 6, 1971

3,591,550
POLYETHYLENE TEREPHTHALATE STABILIZED WITH SULFUR
Robert Nitschmann, Steinebach, Germany, and Wolfgang Griehl, Chur, Switzerland, assignors to Inventa A.G. fur Forschung und Patentverwertung, Zurich, Switzerland
No Drawing. Filed June 6, 1969, Ser. No. 831,231
Int. Cl. C08g 51/56
U.S. Cl. 260—45.7S                                           2 Claims

ABSTRACT OF THE DISCLOSURE

Sulphur is added to a polyester mass during production or processing thereof. The resultant sulphur containing polyester has improved tensile strength and adherence to rubber.

---

The present invention relates to a process for improving the properties of polyester. Furthermore, it relates to the improved polyester and to the use of fibrous material consisting of such polyester, especially fabrics, but also of "non-wovens" in rubber-coated materials, especially as tire cord and to rubber-coated polyester material as an industrial product per se.

Polyester is a synthetic of increasing popularity. This is due to the extreme versatility of the application of polyester, especially as fibre, yarn or thread, but also as sheets, films or tapes or as fabrics but reinforcing rubber-coated articles, e.g. transmission belts, holes and particularly as tire cord. The reason for the manifold applicability of polyester resides in its valuable mechanical and other properties such as low water-absorbing capacity, high melting point, colourlessness, good dimensional stability under mechanical stress, high tensile strength and resistance against most chemicals.

The properties of polyester, however, are not satisfactory for some fields of application. For instance, polyester fibres of high tensile strength, heat resistance and specifically adherence to rubber are desirable for use as tire cord.

The object of the present invention is to provide a modified polyester that has these desired properties to an increased extent. Such modified polyester exhibits the following improvements over conventional polyester:
(a) increased tensile strength,
(b) improved stability of viscosity of the melt during processing; i.e., the viscosity remains nearly unchanged when remelting the modified polyester for spinning purposes whereas conventional polyester suffers a noticeable viscosity drop under such conditions; and
(c) increased adherence to rubber.

Such polyester is characterized in that it contains elemental sulphur. It is obtained by applying to the polyester mass elemental sulphur or compounds (such as organic polysulphide) that release sulphur under the conditions of production or processing of the polyester. The sulphur is thereby dissolved in the polyester mass and partially chemically bonded.

According to the invention all known or conceivable kinds of polyester can be modified with sulphur. However, especially suitable are polymeric and copolymeric condensation products of organic bifunctional acids with organic dihydroxy compounds, such bifunctional acids being especially dicarboxylic acids of the aliphatic, aromatic, cycloaliphatic or aromatic-aliphatic group, particularly succinic acid, sebacic acid, phthalic acid, terephthalic acid or naphthalene dicarboxylic acids; and the dihydroxy compounds being all known and conceivable diols, e.g. aliphatic, cycloaliphatic, aromatic or aromatic-aliphatic dihydroxy compounds, such as ethylene, propylene, butylene or hexylene diols, hydroquinone or cyclohexane dimethylol. Polyterephthalic acid glycol ester and polyterephthalic acid ether ester are preferred.

When operating in a discontinuous mode, the sulphurization of the polyester is preferably carried out with elemental sulphur, suitably in the form of powder, whereas a sulphur melt is generally preferred for the continuous mode of operation. The most favourable instant of time for the sulphurization of the polyester lies between the end of the polymeric condensation and the beginning of the manufacturing of the desired article, such as spinning into threads. In all other respects, the polyester is produced and processed in the known way.

The quantity of sulphur to be applied to the polyester mass ranges from approximately 0.001% to 10% by weight related to the weight of the polyester, depending on the desired properties. For instance, for increasing the stability of the viscosity of the melt, 0.01 to 0.1% of sulphur is required, causing only a light discolouration of the polyester. Beside the stability of the viscosity, however, when an increase of the tensile strength and the adherence to rubber is the primary aim and discolouration of the polyester is of no importance, as in the case for instance for tire cord, the sulphur content ranges up to 10%.

As usual, the sulphur-containing polyester may be processed into sheets, tapes, fibres, threads and the like by spinning from the melt. Thanks to the improved tensile strength and adherence to rubber of the sulphur-containing polyester, such fibres are specifically well adapted for the rubber processing industry to form for instance transmission belts, conveyor belts, tires and the like.

In these cases, best results are achieved by taking fibres of variable length and consisting of the modified polyester and working these fibres into the rubber mass to obtain a reinforced rubber material.

It is advantageous, however, to process these fibres into fabrics that are specifically suitable for tire carcasses.

The adherence of polyester to rubber has as yet been incomplete and difficult to achieve. The sulphur-containing polyester causes an improved affinity to rubber, which is to be considered as a great advantage.

The following examples illustrate the invention without limiting the same.

EXAMPLES NOS. 1 TO 10

Polyethylene terephathalate in the form of chips and having the properties given below in Table 1 under numbers 1 to 5, is powdered with dry pulverulent sulphur in a mixing drum and subsequently spun from the melt by titre 150/34 to form threads in the known way, which threads are then stretched.

The properties of the polyethylene terephthalate threads sulphurized in this way are given in the table under numbers 2–4 and 6–10. The relative viscosity was determined by using a 1% polyester solution in m-cresol at 25° C. in a capillary viscosimeter.

The values of the tensile strength were obtained by the strength tester Scott Testers J.P. 4 according to the principle of constant stress velocity (DIN 53,834).

TABLE 1

| Example No. | Sulphur content in percent by weight of polyester | Stretch ratio | Tensile strength, gms./den. | Relative viscosity Before spinning | Relative viscosity After spinning | Melting point, °C. |
|---|---|---|---|---|---|---|
| 1 (control test) | | 1:5.699 | 6.5 | 1.580 | 1.510 | 256-57 |
| 2 | 0.001 | | 6.8 | | 1.540 | 256-57 |
| 3 | 0.01 | | 6.9 | | 1.555 | 256-57 |
| 4 | 0.5 | | 7.2 | | 1.562 | 256-57 |
| 5 (control test) | | 1:6.018 | 6.9 | 1.590 | 1.508 | 256-57 |
| 6 | 0.5 | | 7.6 | | 1.572 | 256-57 |
| 7 | 1.0 | | 7.8 | | 1.580 | 256-57 |
| 8 | 2.0 | | 7.8 | | 1.579 | 256-57 |
| 9 | 4.0 | | 7.9 | | 1.582 | 256-57 |
| 10 | 6.0 | | 7.8 | | 1.583 | 256-57 |

EXAMPLE NO. 11

The threads produced according to Example 10 from polyethylene terephthalate modified with 6.0% sulphur are processed to a cord twist and moved through a resorcinol-formaldehyde latexing bath. The latexing mixture thus applied to the twist is dried at 150 C. and subsequently fixed at 230° C. The so treated cord twist is then vulcanized into a standard rubber mixture for carcasses consisting of:

| | Parts by weight |
|---|---|
| Natural rubber | 100 |
| Zinc oxide | 4 |
| Stearic acid | 0.5 |
| Carbon black | 20 |
| Phenyl-β-naphthylamine | 1.5 |
| Sulphur | 2.5 |
| Vulcafor-HBS (Imperial Chemical Industries Ltd., London) | 0.7 |

Thereafter, the well known U-test is applied to measure the force required to extract the cord twist from the rubber combination, which force is 10.25 kilograms.

In a parallel experiment using a cord twist of sulphur-free polyethylene terephthalate a considerably lower adherence to rubber of only 8.50 kilograms was found.

EXAMPLE NO. 12

The cord twist of sulphur containing polyethylene terephthalate treated with latex of the above example is vulcanized into a carcass rubber mixture consisting of:

| | Parts by weight |
|---|---|
| Natural rubber | 50 |
| Polybutadiene-rubber (PBR) | 50 |
| Zinc oxide | 4 |
| Stearic acid | 0.5 |
| Carbon black | 20 |
| Phenyl-β-naphthylamine | 1.5 |
| Sulphur | 2.5 |
| Vulcafor-HBS | 0.7 |

According to the U-test an adherence to rubber of 11.46 kilograms is obtained.

In a parallel experiment with sulphur-free cord twist the adherence to rubber is only 9.08 kilograms.

What is claimed is:

1. A polyethylene terephthalate polyester containing elemental sulphur.

2. A polyester according to claim 1 wherein the elemental sulphur is present in an amount of 0.001% to 10% by weight based on the weight of the polyester.

References Cited

UNITED STATES PATENTS

| 2,978,939 | 4/1961 | Howald | 260—45.7 |
| 3,222,301 | 12/1965 | Dahm | 260—2.5 |
| 3,277,060 | 10/1966 | Bell et al. | 260—75 |
| 3,310,532 | 3/1967 | Kazama et al. | 260—75 |
| 3,449,200 | 6/1969 | Kalafus et al. | 161—92 |
| 3,459,787 | 8/1969 | Weesner | 260—470 |

DONALD E. CZAJA, Primary Examiner

R. A. WHITE, Assistant Examiner

U.S. Cl. X.R.

161—231